June 8, 1948. H. A. ROHDIN 2,442,936
BAG AND METHOD OF MAKING SAME
Filed Dec. 6, 1944
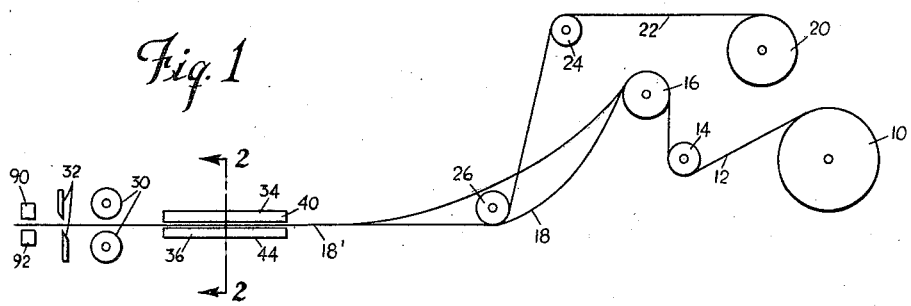
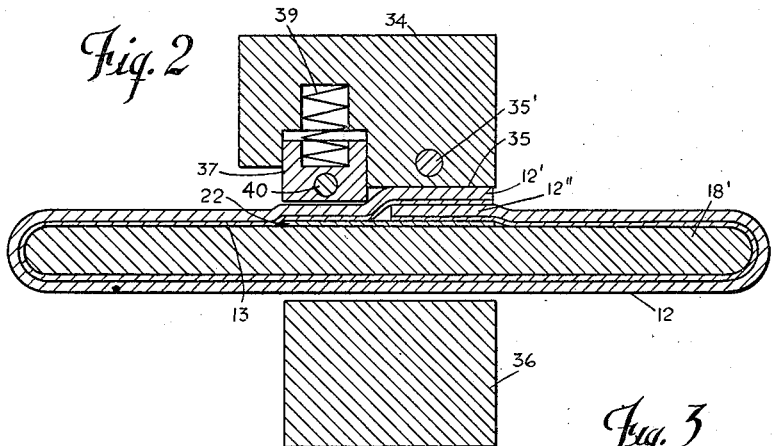
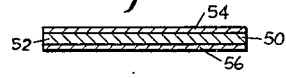
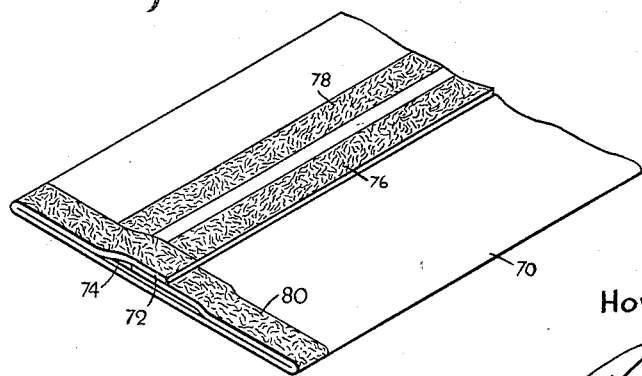
Inventor
Howard A. Rohdin
By Ross C. Hurney
Attorney Patented June 8, 1948

UNITED STATES PATENT OFFICE 2,442,936

BAG AND METHOD OF MAKING SAME

Howard A. Rohdin, Glen Ridge, N. J., assignor to Packaging Industries, Inc., Montclair, N. J., a corporation of New Jersey Application December 6, 1944, Serial No. 566,864

2 Claims. (Cl. 93—35)

It is the primary object of this invention to provide an improved heat sealed bag, and method of making same.

The above and other objects will be made clear from the following detailed description taken in connection with the annexed drawings, in which:

Figure 1 is a schematic diagram illustrating the carrying out of the improved process;

Fig. 2 is a section on the line 2—2 of Fig. 1;

Fig. 3 is a section through one form of a combination sealing and shielding strip;

Fig. 4 is a section through an alternative form of strip; and

Fig. 5 is a perspective view, partly in section, illustrating one form of bag produced by the improved process.

The use of flexible materials in the manufacture of impervious packages has increased enormously within the last few years. Most of the packages and most of the processes for making and closing same are based upon the formation of seals by the application of heat and pressure to the areas to be sealed. There is, moreover, a distinct trend toward the building up of flexible sheets having optimum predetermined characteristics by laminating together a series of sheets, each of which contributes a particular property to the ultimate web.

Metallic foil, for example, affords excellent resistance to penetration by moisture vapor, and by certain light rays. Vinyl resin films, on the other hand, while not so efficient at resisting moisture vapor penetration, have greater tensile strength than metallic foil, and in addition, are heat sealable. Paper, which is the base of most packaging operations, is the cheapest packaging material, has high tensile strength without undue stretch, has excellent resistance to scuffing and abrasion, but, of course, in untreated condition, offers little or no resistance to moisture vapor penetration. Paper may, of course, be coated or impregnated to improve its resistance to moisture vapor penetration, as well as its resistance to water and to greases. Such treatments, however, greatly increase its cost per unit of area, and do not usually improve its qualities to a point comparable with the particular characteristics of metallic foil and the various plastic films.

Certain extremely useful packaging sheets have been developed involving the lamination of synthetic resin films, metallic foil and paper. Until very recently, it has been necessary to utilize special adhesives in order to accomplish the lamination. This added greatly, not only to the cost of the laminating process, but, by increasing the basic weight, added to the cost per unit area of the end product.

There has now been developed a coating compound which may be applied to any surface, and which, once it has been applied and dried, renders the treated surface capable of sealing under heat and pressure to any other surface. That is, a sheet of foil or paper, coated with such material may be laminated directly to paper, glass, synthetic resins, or any other material by the mere application of heat and pressure, without the use of any special adhesive medium. This material is not the subject of the present invention. Its charactertistics have, however, raised certain problems in the manufacture of packages, and it is with the solution of these problems that this invention is concerned.

Fig. 1 is a schematic diagram illustrating the major steps in carrying out the improved process. The supply of bag forming material is stored in a reel 10. A continuous web 12 is drawn from the reel and passes over tension rolls 14 and 16 to a tuber 18 which may be of any conventional form. A supply of shielding strip material is provided in a reel 20 from which a strip 22 is fed over a roll 24 to a guide roll 26. The guide roll 26 is so located with respect to the tuber 18 as to deposit the strip 22 upon the surface of the tuber plate 18' (Fig. 2), before the margins 12' and 12" of the web 12 are folded into superimposed relationship to form a tube. The strip 22 underlies the overlapped margins 12' and 12" (Fig. 2) when the tube is complete. The tube is advanced, step by step, along the tuber by means of feed rolls 30 and consecutive bag lengths are severed from the tube by means of any conventional cutters 32.

Above the tuber plate 18' is a heated pressure member 34, while a similar pressure resisting member 36 is placed on the opposite side of the tuber plate 18', in registry with the member 34. The pressure resisting member 36 is not heated, and has as its sole function the resistance of pressure applied by the member 34. Members 34 and 36 form only the longitudinal seal. In order to complete the bag, a transverse seal must also be supplied. This, however, may be accomplished coincidentally with the formation of the longitudinal seam, or at a subsequent stage including the use of a separate step following the severance of the bag length from the tube. In Fig. 1 the transverse seal is illustrated as being applied immediately after the cutoff, by heated pressure members 90 and 92.

As shown, particularly in Fig. 2, the shielding strip 22 extends somewhat beyond the free edge of the margin 12". As members 34 and 36 approach each other they exert pressure to seal the shielding strip 22, heated by member 34, to the margin 12" and also to the web 12 in the area to the left of the extremity of margin 12", as shown in Fig. 2. At the same time, a heat seal takes place between the coating 13 on the inner surface of the margin 12' and the back of margin 12".

The pressure member 34 is a composite member, having an active surface 35 heated by a heating element 35' and adapted to contact the area of overlap between the margins 12' and 12". An auxiliary bar 37 is mounted in a groove in one side of the member 34. A spring 39 acts to relieve the auxiliary bar 37 which normally extends below the plane of the active portion 35. The auxiliary bar 37 is heated by a heating member 40 and acts to compensate for the difference of thickness occasioned by the overlap between margins 12' and 12'' and to assure sealing of the shielding strip 22 to the interior surface 13 of the web 12 and thus to protect the free edge of the margin 12''.

The nature of the coating 13 is such that under heat and pressure it will seal to any surface, including the surface of the tuber plate 18'. The material of the strip 22, however, is such that while it will heat seal to the surface 13, it will not heat seal to the surface of the tuber plate 18'. The strip 22, therefore, prevents blocking between the web 12 and the tuber plate 18' when the heat seal is formed.

The width of strip 22, as illustrated in Fig. 2, is recommended where liquids, greases, or oily solids are to be packaged, since this arrangement prohibits any leakage or wicking action of the oil or grease into the interstices of the web 12, a raw edge of which is necessarily exposed at 12''. This structure is also useful where the ultimate seal must be hermetically perfect. In practice, assuming that the side of the web 12 opposite the coating 13 is pervious to moisture vapor, the leakage which would take place edgewise through the overlap between margins 12' and 12'' will be negligible for most purposes. Where even this minute amount of leakage is objectionable, the structure shown in Fig. 2 completely bars access from the exterior to the interior of the package, provided the material of the strip 22 be selected for proper characteristics.

In general, if the strip 22 be formed from any of the vinyl resins, it will withstand the heat and pressure incident to sealing the margins 12' and 12'' without its adhering, or even blocking, on the tuber plate 18'. Any of such resins will function perfectly to prevent the wicking of oils or greases into the edge 12'' of the web 12. Where, in addition to preventing the wicking action aforesaid, it is desired to prevent any possible leakage of gases or moisture vapor, a strip 50 as shown in Fig. 3, may be used. Here the strip 50 is composed of a ply 52 formed of metallic foil. One outer surface 54 is formed of vinyl resin, as is the opposite outer surface 56. Surfaces 54 and 56 are supplied in the form of self-sustaining films laminated to the metallic foil 52. By this structure the low mechanical strength of the foil is supplemented by a protective surface on both sides.

Fig. 4 shows a modification of Fig. 3, and comprises a ply of metallic foil 60 laminated to a play of vinyl resin 62. In use, the metallic surface of the ply 60 is in contact with the web 12, in precisely the same manner of the strip 22 shown in Fig. 2. This construction has less mechanical strength than the structure shown in Fig. 3, but is obviously cheaper to manufacture.

In Fig. 5 is shown a bag produced by this improved process. For the sake of simplicity of illustration, a flat bag has been shown, but the principle is equally applicable to a gusseted bag. The bag in Fig. 5 is made up of a tubular body 70, having an overlapped seam 72, with a shielding strip 74 inside the bag, extending the full length of the bag, and underlying the seam 72. The seam 72 has a heat seal in the stippled area 76. One edge of the shielding strip 74 is adhered by heat seal to the interior of the tube 70 in the stippled area 78. The bag is closed at one end by a transverse heat seal in the stippled area 80. During manufacture, the presence of the tuber plate prevents adhesion between the strip 74 and the rear wall of the tube 70 throughout the areas 76 and 78. The area 80, however, receives heat and pressure in advance of the end of the tuber plate, and therefore a heat seal is effected between the front and rear walls of the bag, where they are in contact with each other and between the rear of the bag and the strip 74, and between strip 74 and those portions of the front wall of the bag in contact with said strip 74. This is believed to be the first bag construction in which an overlap seam, as distinguished from the turnback fin type seam, has been used with complete protection of the raw edge of the web against exposure to the interior of the bag.

I claim:

1. A bag formed of flexible sheet material, said material having its entire inner surface heat sealable and having its outer surface formed of pervious fibrous material, said bag having a longitudinal seam formed by overlapping opposed margins of said sheet material and heat sealing the heat sealable surface of one margin to the pervious surface of the opposite margin, a strip of impervious material inside the bag and underlying said seam and being heat sealed to the wall of said bag containing said seam along areas extending longitudinally of said bag for the full length thereof and lying on opposite sides of the edge of the innermost of said overlapped margins said bag being closed by a transverse heat seal securing the walls of the bag to each other and to said strip.

2. A method of making bags comprising: forming a web of sheet material into a tube around a mandrel or former plate by overlapping opposed margins of said web to form a seam, the outer surface of said web being formed of pervious, fibrous material; the inner surface of said web being impervious and capable of sealing, under heat and pressure, to itself, to the outer surface of said web and to said mandrel; closing said seam by applying pressure to registering areas on opposite sides of said mandrel and simultaneously applying heat to the area in contact with said seam, and placing a strip of impervious material between said seam and said mandrel prior to the application of heat and pressure, said strip underlying the area of overlap of said margins and extending beyond said area and beyond the edge of the innermost margin in the direction of said margin, the surface of said strip in contact with the inner surface of said web having the property of sealing thereto under heat and pressure and the opposite surface of said strip being incapable of sealing to said mandrel.

HOWARD A. ROHDIN.

REFERENCES CITED

The following references are of record in the file of this patent:

UNITED STATES PATENTS

| Number | Name | Date |
|---|---|---|
| 2,003,494 | Reynolds | June 4, 1935 |
| 2,103,339 | Salfisberg | Dec. 28, 1937 |
| 2,162,769 | Williams | June 20, 1939 |
| 2,169,936 | Wagner | Aug. 15, 1939 |
| 2,177,894 | Lakso | Oct. 31, 1939 |
| 2,290,564 | Krueger | July 21, 1942 |